United States Patent [19]

Rogers

[11] 4,009,067
[45] Feb. 22, 1977

[54] PROCESS OF FABRICATING COMPOSITE STRUCTURAL MEMBERS
[76] Inventor: Charles W. Rogers, 4029 Shadow Drive, Forth Worth, Tex. 76116
[22] Filed: July 7, 1975
[21] Appl. No.: 593,437
[52] U.S. Cl. .............................. 156/245; 156/285; 156/286; 156/292; 156/293; 428/114; 428/295; 428/179; 428/182
[51] Int. Cl.$^2$ ......................................... B29C 17/04
[58] Field of Search .......... 156/285, 296, 245, 267, 156/293, 300, 292, 276; 428/114, 295, 109, 124, 174, 179, 182

[56] References Cited
UNITED STATES PATENTS

| | | | |
|---|---|---|---|
| 3,072,520 | 1/1963 | Groth | 156/286 |
| 3,674,620 | 7/1972 | McCarthy et al. | 428/114 |
| 3,686,051 | 8/1972 | Samuel et al. | 156/285 |
| 3,687,768 | 8/1972 | Vaitses et al. | 156/293 |
| 3,767,740 | 10/1973 | Jones-Hinton et al. | 156/292 |
| 3,932,249 | 1/1976 | Jury et al. | 156/286 |
| 3,959,544 | 5/1976 | Rogers | 428/109 |

Primary Examiner—Charles E. Van Horn
Assistant Examiner—Jerome W. Massie
Attorney, Agent, or Firm—Arthur F. Zobal

[57] ABSTRACT

A process of fabricating a composite structural member which has opposite sides produced from preformed sheets of thermoplastic material. In carrying out the process, reinforcing material comprising fibers and thermosetting resin in the uncured state is layed on the inside of one of the performed sheets. The two preformed sheets are assembled together with the reinforcing material located there between. The edges of the preformed sheets are sealed and a vacuum drawn. The resin is then allowed to cure to cause the resin and fiber to bond together and to the performed thermoplastic sheets and which become an integral part of the structural member.

5 Claims, 9 Drawing Figures

U.S. Patent   Feb. 22, 1977   Sheet 1 of 2   4,009,067
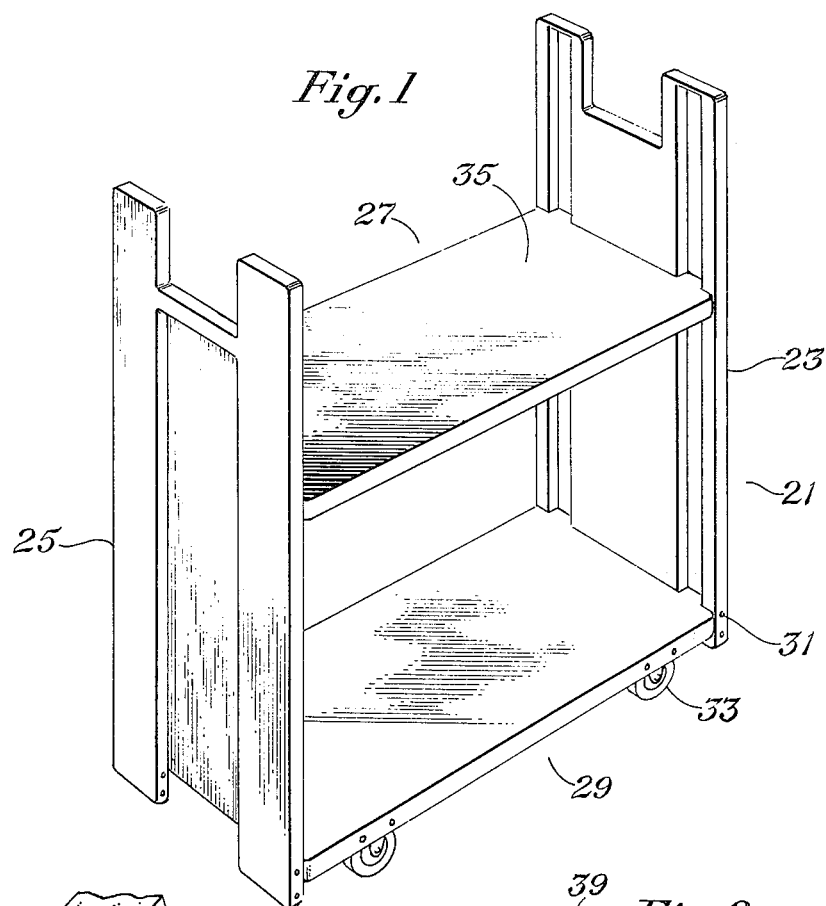
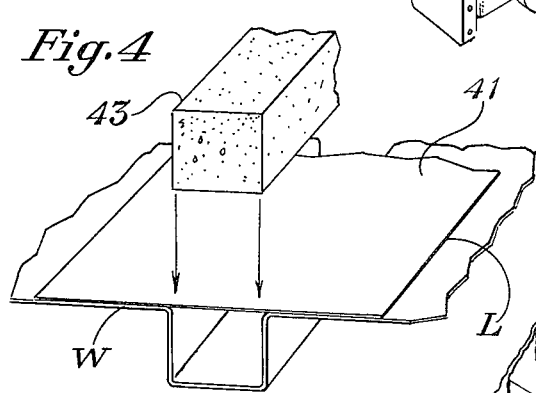
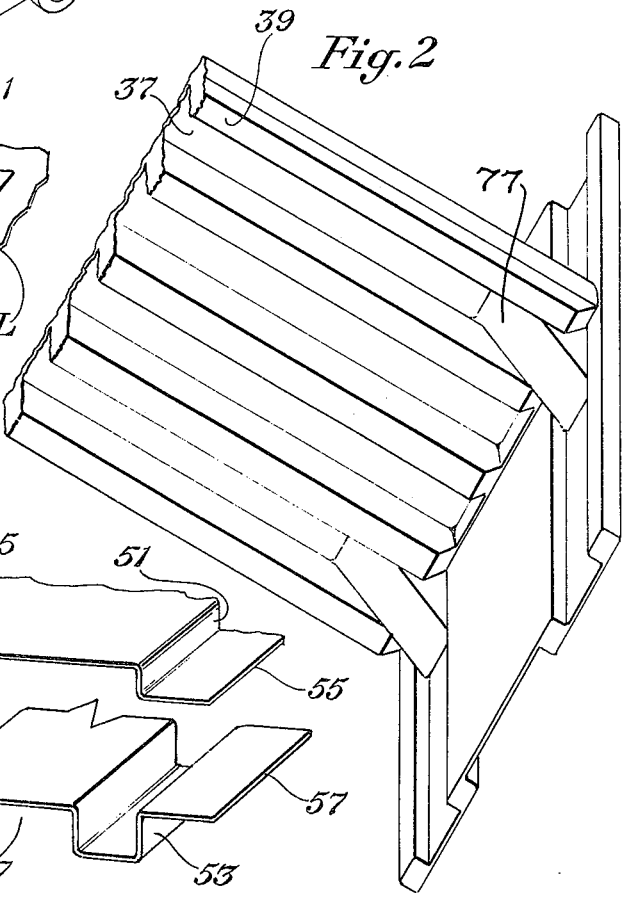
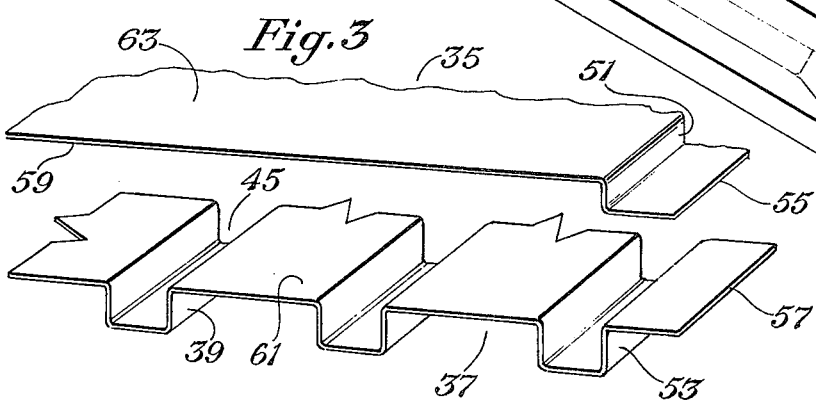

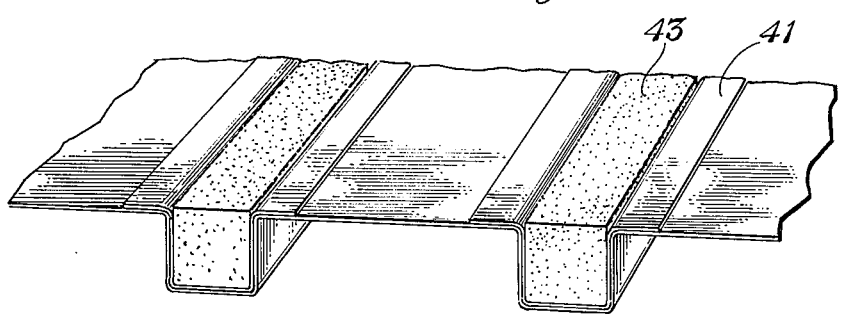
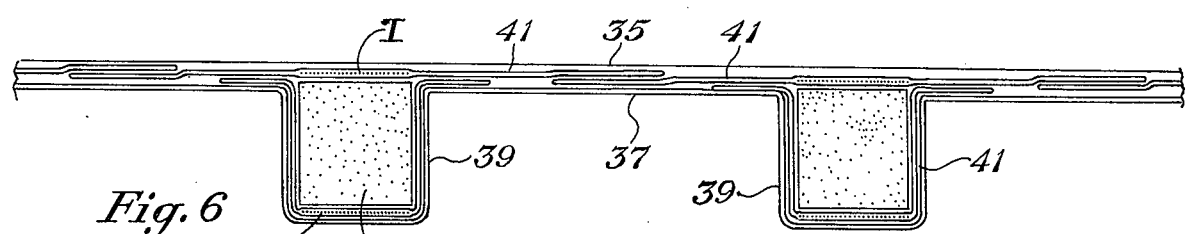
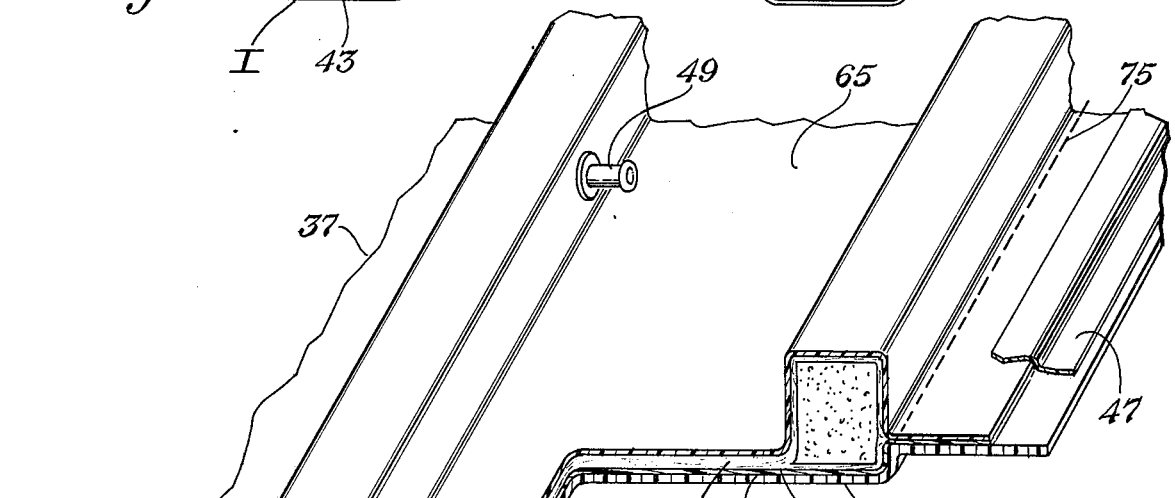
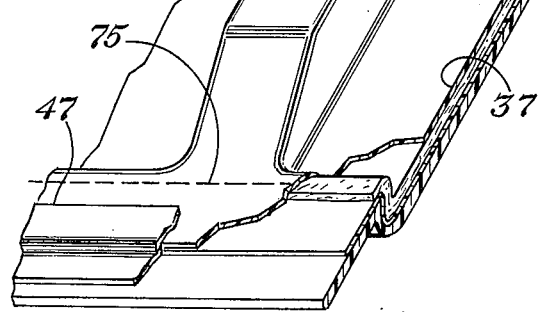
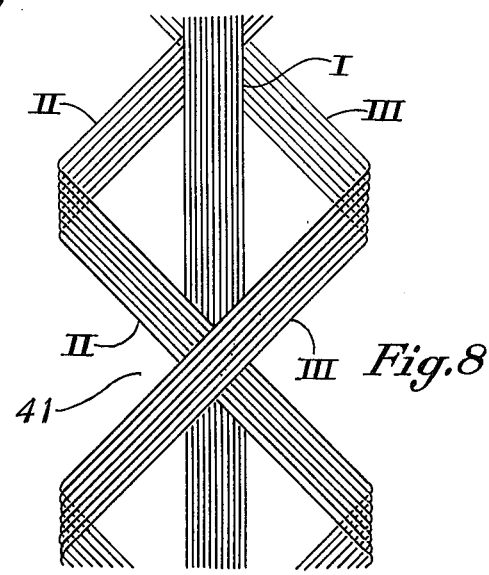

PROCESS OF FABRICATING COMPOSITE STRUCTURAL MEMBERS

BACKGROUND OF THE INVENTION

This invention relates to a process of forming composite structural members and more particularly to such a process using plies of fibers and resin in the uncured state and wherein preformed sheets of thermoplastic material are used as a tool and as a vacuum bag and which become an integral part of the structural member upon curing of the resin.

In U.S. Pat. No. 3,959,544 filed by me on Dec. 26, 1973 and entitled "Filamentary Tape Construction and Methods" there is disclosed structural members fabricated from a tape formed from plies of unidirectional fibers impregnated with a matrix such as a thermosetting resin in the uncured state. In the embodiment disclosed, the structural members formed are employed to form a warehouse cart. The fibers preferably are of fiber glass although they may be formed of graphite or boron. In an earlier process of fabricating the structural members, the tape is laid in a desired manner against a rigid preformed tool surface to form one side of the structure. Foam stiffner forms are laid over the tape at spaced apart positions and an additional layer of tape is laid over the foam stiffner forms and over the first layer of tape. A thin film vacuum bag next is placed over the lay-up and sealed to the tool and a vacuum drawn. The vacuum bag is formed of a material that does not stick to the resin used. The resin then is allowed to cure and after curing the vacuum bag is then removed and discarded.

Although carts formed from such structural members are relatively light weight and have the desired strength, thickness, and serviceability, the manufacturing process has some disadvantages. For example the finished carts are crude looking since the foam stiffner forms are sometimes irregularly spaced. This is due to the fact that there is no positive way to locate the foam stiffner forms during the lay-up operation. In addition, the time required to place the tape on the "floating stiffner forms" is longer than desired. Since the thin film vacuum bag is used only once and then discarded, the cost is higher than desired. Moreover, since the thin film vacuum bag must fit loosely, it wrinkles when the vacuum is achieved. These wrinkles cause unsightly resin ridges. In order to minimize these wrinkles, considerable time and effort must be spent by the workman hand rubbing and otherwise moving the wrinkles to regions of the part where they are not as noticeable. On portions of the structural members which are curved, small pits or air pockets are formed. This is due to the fact that the tape is relatively coarse, trapping large amounts of air all of which is not removed during the vacuum cure process.

SUMMARY OF THE INVENTION

It is an object of the present invention to provide a process of fabricating a composite structural member from reinforcing material comprising plies of fibers and thermosetting resin in the uncured state and which avoids the above disadvantages.

It is a further object of the present invention to fabricate a composite structural member using two preformed sheets of thermoplastic material as a tool for the reinforcing material and as a vacuum bag and which are bonded to the resin and fibers during the curing process whereby the two preformed sheets become an integral part of the composite structural member and form the outer surfaces thereof.

The two preformed sheets employed are adapted to be assembled together with their inside surfaces facing each other. They are shaped such that the inside surfaces of their outer edges will abut against each other with a cavity formed between the sheets inward of their outer edges when the two sheets are assembled together. They have a thickness sufficient to maintain their preformed shapes at atmospheric pressure during lay-up of reinforcing material but thin enough to be moved inward to seat against the reinforcing material by creating a pressure differential such as reducing the pressure in the cavity to less than atmospheric pressure. In carrying out the process, the reinforcing material is laid on the inside of one of the two sheets in an area which defines the wall of the cavity. The two preformed sheets are assembled together by abutting the inside surfaces of their outer edges with the reinforcing material located in the cavity therebetween. The outer edges of the two preformed sheets are sealed and a pressure differential created between the inside and the outside of the cavity with a lower pressure maintained within the cavity relative to the pressure outside of the cavity to cause the walls of the two preformed sheets to seat against the reinforcing material. The resin of the reinforcing material then is allowed to cure to cause the resin and the fibers to bond together and to the preformed thermoplastic sheets which become an integral part of the structure defining the outer sides thereof.

The thermosetting resin has a curing temperature less than the softening temperature of the thermoplastic sheets of material and is of the type capable of bonding to the thermoplastic material. In the preferred embodiment, curing of the resin is accomplished by heating the assembled structure to a temperature less than the softening temperature of the thermoplastic material. The fibers of the reinforcing material are of the type selected from the class consisting of fiberglass, graphite, and boron.

BRIEF DESCRIPTION OF THE DRAWINGS

FIG. 1 is a perspective view of a portable warehouse cart constructed in accordance with the principles of the present invention;

FIG. 2 is a view of a portion of the underside of one of the shelves of the cart in FIG. 1;

FIG. 3 is a partial perspective view of the preformed sheets used in the process of the invention for forming the structural members employed to construct the cart of FIG. 1;

FIGS. 4 and 5 illustrate the steps of laying fiber impregnated tapes and foam stiffner forms in the grooves of the preformed sheet forming the underside of one of the shelves of the cart of FIG. 1;

FIG. 6 is a cross-section of one of the shelves of FIG. 1 illustrating layers of fiber tape and the foam stiffner forms located between the two preformed sheets when assembled together;

FIG. 7 is a partial cut away illustrating the assembly of FIG. 6 supported on a tool with the outer edges of the preformed sheets sealed together and to the tool and a vacuum port formed in one of the sheets for drawing a vacuum;

FIG. 8 illustrates the manner in which the unidirectional fibers of the fiber preimpregnated unwoven tape are oriented. In this figure only a portion of fibers are illustrated for purposes of clarity;

FIG. 9 is a cross-section taken through the width of the tape of FIG. 8.

DETAILED DESCRIPTION OF THE INVENTION

Referring now to FIG. 1, reference numeral 21 identifies a warehouse cart formed from two side members 23 and 25 and two shelves 27 and 29 assembled together by way of pins 31. The structural members forming the sides and shelves are all constructed in accordance with the principle of the present invention. In the embodiment disclosed, the cart has wheels 33 attached to the bottom shelf to provide mobility. Such a cart, when constructed in accordance with the present invention, has a strength -to-weight ratio which is much higher than a cart of similar size constructed of steel, magnesium, or aluminum, and moreover has a very pleasant appearance, is easy to clean, and is resistant to many chemicals.

In the following discussion, there will be described the manner in which the shelf 27 is fabricated. As seen in FIGS. 1 and 2, shelf 27 has a flat top side 35 and a bottom side 37 with spaced support ribs or ridges 39 extending along the length thereof. The top and bottom sides 35 and 37 are formed of preformed sheets of thermoplastic material as illustrated in FIGS. 3-7. The main strength of the shelf is provided by layers of tape 41 formed of plies of unidirectional fibers sandwiched between the two preformed sheets 35 and 37. Foam stiffner forms 43 are located in the grooves 45 of the ridges 39 between the layers of tape. The fibers of the tape preferably are formed of fiber glass preimpregnated with a thermosetting resin in the uncured state. In the fabrication process, the tape and foam stiffners are laid on the inside surface of the one of the preformed sheets. The other preformed sheet then is assembled over the lay-up and the outer edges of the sheets are sealed with a tape 47. A vacuum is drawn through a port 49 and the assembled structure heated to cure the resin, to bond the resin and fibers together and to the preformed sheets whereby the preformed sheets become an integral part of the structural member and form the outside surface thereof.

Preferably the sheets of thermoplastic material used for forming the sides 35 and 37 are of acrylo-butadiene styrene (also referred to as ABS). This material will stick or bond to the resin employed in the tape 41 which preferably is an epoxy resin. The ABS sheets employed have a thickness of about 25 mils. The softening temperature of the ABS sheets is about 225° F. A separate tool or mold is employed for preforming the thermoplastic sheets to conform to the shape of the sides 35 and 37. Each ABS sheet is clamped to a frame and heated in an oven to about 225° F to soften the thermoplastic sheet. When the heated sheet begins to sag, it is removed from the oven and the proper tool pressed up into the soft thermoplastic sheet. A vacuum is applied between the sheet and the tool to pull the softened sheet into the tool. When the thermoplastic sheet cools and hardens to its preformed shape, it is removed from the tool by the use of air pressure. The tool or mold employed for preforming the sheets 35 and 37 may be formed of wood to provide a relatively cool surface to shorten the cooling time of the heated ABS sheets.

As illustrated in FIGS. 3 and 7, the preformed sheets 35 and 37 are formed such that they have narrow outer sides 51 and 53 with outer edges 55 and 57 extending therefrom in the planes of the sheets. The preformed sheets 35 and 37 have the same length and widths. They are adapted to be assembled together with their insides surfaces 59 and 61 facing each other and with their outer edges 55 and 57 in abutting relationship. When assembled in this manner, a cavity 71 is formed between the two sheets inward of their outer edges. Note FIG. 7.

Having formed the preformed sheets 35 and 37, the preimpregnated fiber tape 41 and foam stiffner forms 43 are laid up on the inside of the preformed sheet 37 which forms the bottom of the shelf. In the lay-up procedure, the preformed sheet 37 is turned and supported such that its inside surface 61 faces upward. Next lengths of the fiber tape 41 preimpregnated with a thermosetting resin in the uncured state are laid over the grooves 45 with their edges overlapping the inside surface 61 of the sheet a substantial distance beyond the grooves 45 as illustrated in FIG. 4. In FIG. 4, the width of the tape 41 is defined by W while its length is indicated by L. Next foam stiffners form 43 having dimensions of length, width, and height slightly less than the length, width, and height of the grooves 45 are laid over the tape 41 and pressed down into the grooves. This pushes the tape down and properly aligns it in the grooves as illustrated in FIG. 5. In this process, the edges of the tape 41 are pulled inward toward the grooves such that their edges extend outward against the the surface 61 about an inch on each side of the grooves. A length of tape 41 then is laid over each of the foam stiffner forms 43 with its edges overlapping the edges of an adjacent tape about one inch as illustrated in FIG. 6. Since the grooves 45 are preformed in the sheet 37, lay-up of the tape and the foam stiffner forms may be done accurately and rapidly. Having completed the lay-up of the reinforcing material on the preformed sheet 37, the top sheet 35 is turned to face its inside surface 59 downward and is then assembled to the sheet 37 such that the outer edges 55 of sheet 35 abut the outer edges 57 of sheet 37.

Next the assembled structure is turned over such that the outer surface 63 of the top sheet 35 faces downward and the outer surface 65 of the bottom sheet 37 faces upward. The assembled structure then is placed on a stiff tool 73 (see FIG. 7) having a mold surface with the same contour and configuration of the outer surface 63 of the top sheet 35. In this position on the tool, the outer surface 65 of the bottom sheet 37 of the assembled structure faces upward. The tool 73 may be formed from one of the preformed sheets 35 with its inside surface 59 serving as the mold surface and with its opposite surface reinforced with fiber glass and resin to form a stiff tool. The edges of the preformed sheets 35 and 37 have their edges trimmed such that the edges of the tool 73 extend beyond the edges of the sheets 35 and 37 as illustrated in FIG. 7.

Next the edges 55 and 57 of the sheets 35 and 37 are sealed together and to the tool 73 by the use of the tape 47. Port 49 is formed through the wall of one of the ribs 39 in direct fluid communication with its groove 45. A vacuum line (not shown) is attached to the port and a vacuum of about 28 inches of mercury drawn. This removes the air from between the two sheets; removes any excess resin; and assures integral contact between the preimpregnated tape and the sheets 35 and 37 and the foam stiffner forms 43. Since the fibers of the tape 41 are relatively springy and since the foam stiffner forms may be slightly warped, the various elements may not properly seat out without the use of the vacuum pressure. Although more vacuum ports may be employed, one port has been found to be sufficient. This is due to the fact that grooves 45 are relatively closely spaced, and air can bleed to the grooves and between the grooves and the foam stiffners such that there is a complete manifold system between the two sheets and the foam stiffners.

Having drawn the vacuum, the assembled structure on the tool 73 then is placed in an oven and heated to about 140° F for about 2 hours to cure the resin. During the first hour, the assembly is heated while under the vacuum. During this first hour, the resin cures sufficiently such that it will not flow whereby during the second hour, the vacuum may be removed. Alternate resin systems such as epoxy-novolac or polyimide may require additional pressure on the outside of the structural member such as that achieved by use of an autoclave.

During the curing process, the resin and fibers are bonded together and to the preformed sheets 35 and 37 whereby the preformed sheets become an integral part of the structural member and form the outer surface thereof. After curing, the assembly is removed from the oven and the outer edges 55 and 57 trimmed off along the dotted line 75 (see FIG. 7) with the use of a diamond tipped saw. Although not shown in the right of FIG. 7, the edges of the cured tape 41 extend slightly beyond the edges of the dotted line 75 and hence will also be trimmed.

Thus as can be understood, the preformed sheets 35 and 37 act as a tool for forming the shape of the structural member; as a vacuum bag; and become an integral part of the member. With a thickness of about 25 mils, the sheets have a thickness sufficient to maintain their preformed shape during lay-up of the reinforcing material and assembly thus assuring proper location of the structural components but are thin enough to allow a vacuum to draw the sheets inward sufficient to seat out the various components of the member. The preformed sheets minimize lay-up time and yet allow accurate placement of the tape 41 and the foam stiffner forms. Since the preformed sheets 35 and 37 form the outer surface of the member, they completely eliminate the wrinkling problems previously encountered and cover up any pits or holes formed in the fiber glass tape. Moreover, since the ABS sheets are manufactured in different colors and textures, they eliminate the need of subsequent painting thereby simplifying the job of obtaining a color or texture on the surface. Thus with the present process, labor cost are reduced significantly while at the same time a high strength structural member is formed with a pleasing and uniform outer finish. The main strength of the structure is provided by the fiber tape 41 as described above.

In one embodiment, the shelf 27 has a dimension of 27 inches × 57 inches and a thickness of about 2 inches. It has five ridges or ribs 39 for support purposes. The grooves 45 have a width and a height slightly greater than about 1½ inches. The foam stiffner forms 45 may be formed of foam polyurathane having a density of about 2 pounds per cubic foot. The purpose of the foam stiffner forms are to maintain the ribs 39 in their desired shape while the vacuum is drawn and during curing. If desired, the stiffner forms 45 may be formed of other light weight material such as balsa wood although the expense may be greater. Although the thermoplastic sheets 35 and 37 preferably are each formed from ABS material, it is to be understood that they may be formed from other types of material which will stick or bond to the epoxy resin. Such materials are poly vinyl flouride which has been given a special surface treatment or high density poly styrene. For a given structural member, the sheets 35 and 37 each may be formed from the same thermoplastic material or from dissimilar thermoplastic materials. The tape 47 used for sealing purposes may be Scotch tape formed from poly vinyl chloride. The preimpregnated fiber tape 41 has a width of about 8 inches.

At the same time the shelf 27 is formed, the support brackets 77 for the shelf are also formed as well as apertures for receiving the pins 31. The support brackets are formed of foam stiffners and tape 41. The same process as described above is used to fabricate the shelf 29 and side members 23 and 25.

In the preferred embodiment, the tape 41 employed is of the type disclosed and claimed in U.S. Pat. No. 3,959,544. Referring to FIGS. 8 and 9 the tape 41 comprises a ply I of unidirectional fibers sandwiched between (+) and (−) angle plies II and III of unidirectional fibers located on opposite sides of ply I. The fibers of ply I extend along the length of the tape while the fibers of angle plies II and III extend obliquely (+) and (−) 45° relative to the fibers of the unidirectional ply I. As illustrated in FIG. 8, the fibers of the upper plies II and III extend transversely to each other and the fibers of the lower plies II and III extend transversely to each other. In addition the fibers of the upper and lower plies II extend transversely to each other and the fibers of the upper and lower plies III extend transversely to each other.

In the preferred embodiment, the tape of FIGS. 8 and 9 is produced by aligning a ribbon or ply I of unidirectional fibers approximately one inch wide, with a thickness equal to the diameter of the individual strands, along the length of a mandrel having a perimeter of about 16 inches. The mandrel then is wrapped with another one inch wide ribbon of unidirectional fibers, obliquely around the circumference of the mandrel and over the ply I to form the angle ply II. The mandrel next is wrapped with another one inch wide ribbon of fibers around the circumference of the mandrel, obliquely over the fibers of the ply I and transversely over the fibers of the angle ply II to form the angle ply III. Preferably the fibers of plies II and III are wrapped such that they are perpendicular to each other and at angles of about (+) and (−) 45° relative to the fibers of ply I. The mandrel is removed and the resulting tube of fibers is next collapsed to a flat, 8 inch wide tape. An epoxy resin and a versamide catalyst are then coated or spread uniformly over the plies to form the preimpregnated tape of FIGS. 8 and 9. In these figures, the resin and catalyst coating are not illustrated and in FIG. 8, only a portion of the fibers are shown for purposes of clarity. The flat tape then is placed on a 9 inch wide polyethylene film or sheet and rolled on a reel for storage or immediate use. The tape may be stored at a temperature of 0° or less for a period of time. Such tapes may thereafter be removed from cold storage and warmed to room temperature for purposes of forming the desired structural members. Although in the process of forming the desired structural member, the member after assembly was described as being placed in an oven and heated to 140° for 2 hours for curing purposes, it is to be understood that curing of the resin of the tape may be accomplished with other cure cycles of curing mechanisms. For example curing may be carried out at room temperature for 24 hours. In another example curing may be carried out by radiation curing.

In the preferred embodiment, the fibers employed to form the tape 41 are of fiberglass although it is to be understood that the fibers may be formed from high modulus fibers such as those of graphite, boron or Kevlar (aramid polymers). These are extremely high modulus to weight materials. The modulus of graphite of interest is $30 \times 10^6$ psi or greater; the modulus of boron is about $58 \times 10^6$ psi; and the modulus of Kevlar is about $20 \times 10^6$ psi.

As described in the above U.S. Pat. No. 3,959,544, the subject tape may be used effectively for constructing a load bearing member which has compound contours. In structures formed from this tape, both the fibers and the resin, when cured, will carry loads. The unidirectional ply I carries primarily tension and compression loads such as found on the cap of a spar or beam. The angle or bias plies II and III do not carry any tension or compressions loads but do carry shear and torsional loads. In forming a load bearing member, the unidirectional ply I is laid only on simple contour surfaces such as straight or cylindrical surfaces or on very mild compound curvatures surfaces. The angle plies will stretch or contract in the direction of the tape and therefore can be laid on surfaces that have extreme compound contours without wrinkling. Thus, the tape has built in fiber orientation necessary to form the desired load bearing members having compound contours and accomplishes with a single tape, the structural intent of prior art lay-up procedures for forming structural members. In forming the shelf 27, the first layer of tape 41 is laid over the groove 45 such that the ply I extends over the groove with its fibers extending along the length of the groove. When the tape is pressed into the groove by the foam stiffners 43, the ply I will rest along the bottom of the groove while the extending edges of the angle plies II and III will extend vertically up and along the sides of the groove and then outward on opposite sides of the groove along the plane of the preformed sheet 37. In laying the next layer of tape 41 over the foam stiffner 43, the tape will be laid such that the ply I extends over the foam stiffner with its fibers extending along the length of the foam stiffner and with the extending edges of the angle plies II and III extending outwardly on opposite sides thereof. As indicated above, the unidirectional ply I will carry the tension and compression loads while the angle or bias plies II and III will carry the shear and torsional loads of the structural member. Since the fibers of the angle plies permit extensive diagonal stretch, complex curvatures such as those shown in FIG. 7 are easily formed prior to curing the resin without forming wrinkles in the tape.

The tape 41 can be constructed automatically and economically by laying the unidirectional ply I along the length of the tape on the mandrel and by winding the fiber ribbons or tows in opposite directions relative to each other and obliquely relative to the narrower ply I to form the angle plies II and III. Although the narrow ply I of unidirectional fibers has been described as being located between the plies II, it is to be understood that one or more of such plies I may be located between the plies II and III or on the outside of the plies III. With this process, the unidirectional ply I is formed of continuous fibers and with the winding process, the angle plies II and III also are formed of continuous fibers. Thus the tape constructed is an unwoven tape formed of continuous fibers and has the unique ability to stretch or to contract in the bias ply region of the tape and thus form complex contours.

Although in the preferred embodiment, the lay-up of the reinforcing fibers on the preformed sheet 37 is accomplished with the use of the preimpregnated tape 41, it is to be understood that the prior art lay-up procedure may be employed to separately stack individual plies of fibers on each other to obtain the desired fiber orientation, although such a process is tedious and time consuming.

Although shelves and side members of a cart were described as being fabricated using the process of the present invention, it is to be understood that the process of the present invention may be employed to fabricate other types of structural members such wing and fuselage structures. The fibers employed in forming these structures will be the high modulus fibers mentioned above.

I claim:

1. The method of fabricating a structural member having two opposite sides of predetermined shapes, respectively, comprising the steps of:
    obtaining two preformed sheets of thermoplastic material preformed to said predetermined shapes respectively,
    said two preformed sheets being adapted to be assembled together with their inside surfaces facing each other,
    said two preformed sheets being shaped such that the inside surfaces of their outer edges will abut against each other with a cavity formed between said two preformed sheets inward of their outer edges when said two preformed sheets are assembled together,
    laying reinforcing material on the inside of at least one of said two preformed sheets in an area which defines the wall of said cavity,
    said reinforcing material comprising thermosetting resin in the uncured state reinforced with fibers,
    said thermosetting resin being of the type capable of bonding to said thermoplastic material,
    said thermoplastic sheets of material having a thickness sufficient to maintain said predetermined shapes at atmospheric pressure during lay-up of the reinforcing material but thin enough to be moved inward to seat against the reinforcing material by a pressure differential created between the inside and outside of the cavity,
    assembling said two preformed sheets together by abutting the inside surfaces of their outer edges with said reinforcing material located in said cavity between said two preformed sheets,
    sealing together the outer edges of said two preformed sheets,
    creating a gas pressure differential between the inside and outside of the cavity with a lower pressure maintained within the cavity relative to the pressure outside of the cavity to cause the walls of said two preformed sheets to seat against said reinforcing material, and
    curing said resin at a temperature less than the softening temperature of said thermoplastic material to cause said resin and said fibers to bond together and to said preformed sheets such that said preformed sheets become an integral part of said structural member and define the outer surface thereof.

2. The method of claim 1 wherein said gas pressure differential is created by withdrawing air from said cavity formed between said two preformed sheets.

3. The method of fabricating a structural member having two opposite sides of predetermined shapes, respectively, comprising the steps of:

forming said two sides by preforming two sheets of thermoplastic material to said predetermined shapes, respectively, said two preformed sheets being adapted to be assembled together with their inside surfaces facing each other, said two preformed sheets being shaped such that the inside surfaces of their outer edges will abut against each other with a cavity formed between said two preformed sheets inward of their outer edges when said two preformed sheets are assembled together, laying reinforcing material on the inside of at least one of said two preformed sheets in an area which defines the wall of said cavity, said reinforcing material comprising thermosetting resin in the uncured state reinforced with fibers, said thermosetting resin having a curing temperature less than the softening temperature of said thermoplastic material and being of the type capable of bonding to said thermoplastic material, said thermoplastic sheets of material having a thickness sufficient to maintain said predetermined shapes at atmospheric pressure during lay-up of the reinforcing material but thin enough to be moved inward to seat against the reinforcing material by pressure differential created between the inside and outside of the cavity, assembling said two preformed sheets together by abutting the inside surfaces of their outer edges with said reinforcing material located in said cavity between said two preformed sheets, sealing together the outer edges of said two preformed sheets, creating a gas pressure differential between the inside and outside of the cavity with a lower pressure maintained within the cavity relative to the pressure outside of the cavity to cause the walls of said two preformed sheets to seat against said reinforcing material, and heating said assembled structural member to a temperature less than the softening temperature of said thermoplastic material but sufficient to cure said resin and to cause said resin and said fibers to bond together and to said preformed sheets such that said preformed sheets become an integral part of said structural member and define the outer surface thereof.

4. The method of claim 3 wherein said fibers are structural fibers selected from the class consisting of fiberglass, graphite, boron and high modulus aramid polymers.

5. The method of claim 3 wherein said gas pressure differential is created by withdrawing air from said cavity formed between said two preformed sheets.

* * * * *